United States Patent
Carvelli et al.

(10) Patent No.: US 7,310,414 B2
(45) Date of Patent: Dec. 18, 2007

(54) PREPAID PHONE CARD SERVICE USING SPEECH RECOGNITION

(75) Inventors: Robert Carvelli, Flemington, NJ (US);
Michelle Pond, Somerset, NJ (US);
Gary Allen Smith, Annandale, NJ (US); Robert M. Stanchina, Easton, PA (US)

(73) Assignee: AT&T Corp., New York, NY (US)

( * ) Notice: Subject to any disclaimer, the term of this patent is extended or adjusted under 35 U.S.C. 154(b) by 205 days.

(21) Appl. No.: 10/803,701

(22) Filed: Mar. 18, 2004

(65) Prior Publication Data

US 2005/0207549 A1  Sep. 22, 2005

(51) Int. Cl.
*H04M 15/00* (2006.01)
*H04M 17/00* (2006.01)

(52) U.S. Cl. .............................. 379/114.2; 379/114.01; 379/114.15; 379/144.01

(58) Field of Classification Search ........... 379/114.01, 379/114.15, 114.16, 114.17, 114.2, 127.01, 379/127.02, 127.03, 144.01, 144.06
See application file for complete search history.

(56) References Cited

U.S. PATENT DOCUMENTS

| | | | |
|---|---|---|---|
| 5,315,649 A | * | 5/1994 | Foster et al. ........... 379/355.04 |
| 5,539,861 A | | 7/1996 | DeSimone |
| 5,859,897 A | * | 1/1999 | Furman et al. .......... 379/88.01 |
| 5,960,442 A | | 9/1999 | Pickering |
| 6,233,316 B1 | * | 5/2001 | Schier et al. ............ 379/88.03 |
| 6,456,699 B1 | | 9/2002 | Burg et al. |
| 6,529,593 B2 | * | 3/2003 | Nelson .................... 379/114.2 |
| 6,931,110 B2 | * | 8/2005 | Bates et al. ............ 379/144.01 |
| 2004/0047457 A1 | | 3/2004 | Wang |

* cited by examiner

*Primary Examiner*—Quoc Tran
(74) *Attorney, Agent, or Firm*—Hoffman & Baron, LLP

(57) ABSTRACT

A method for placing a telephone call from a caller using a prepaid phone card includes the steps of connecting a caller with a caller interface having a speech recognition application, receiving voice input from the caller in the form of phone card information spoken by the caller, comparing the voice input from the caller with personalized prepaid phone card information previously stored in a database and placing a requested telephone call if the voice input from the caller matches the personalized prepaid phone card information stored in the database. The personalized prepaid phone card information stored in the database may be a personal identification number (PIN) assigned to the caller's phone card and the voice input from the caller is in the form of a personal identification number (PIN) spoken by the caller. The speech recognition application then compares the spoken personal identification number with the personal identification number (PIN) stored in the database. The method may further include the step of retrieving a telephone number stored in the database if a voice input from the caller matches a telephone number identifier assigned to the telephone number.

5 Claims, 4 Drawing Sheets

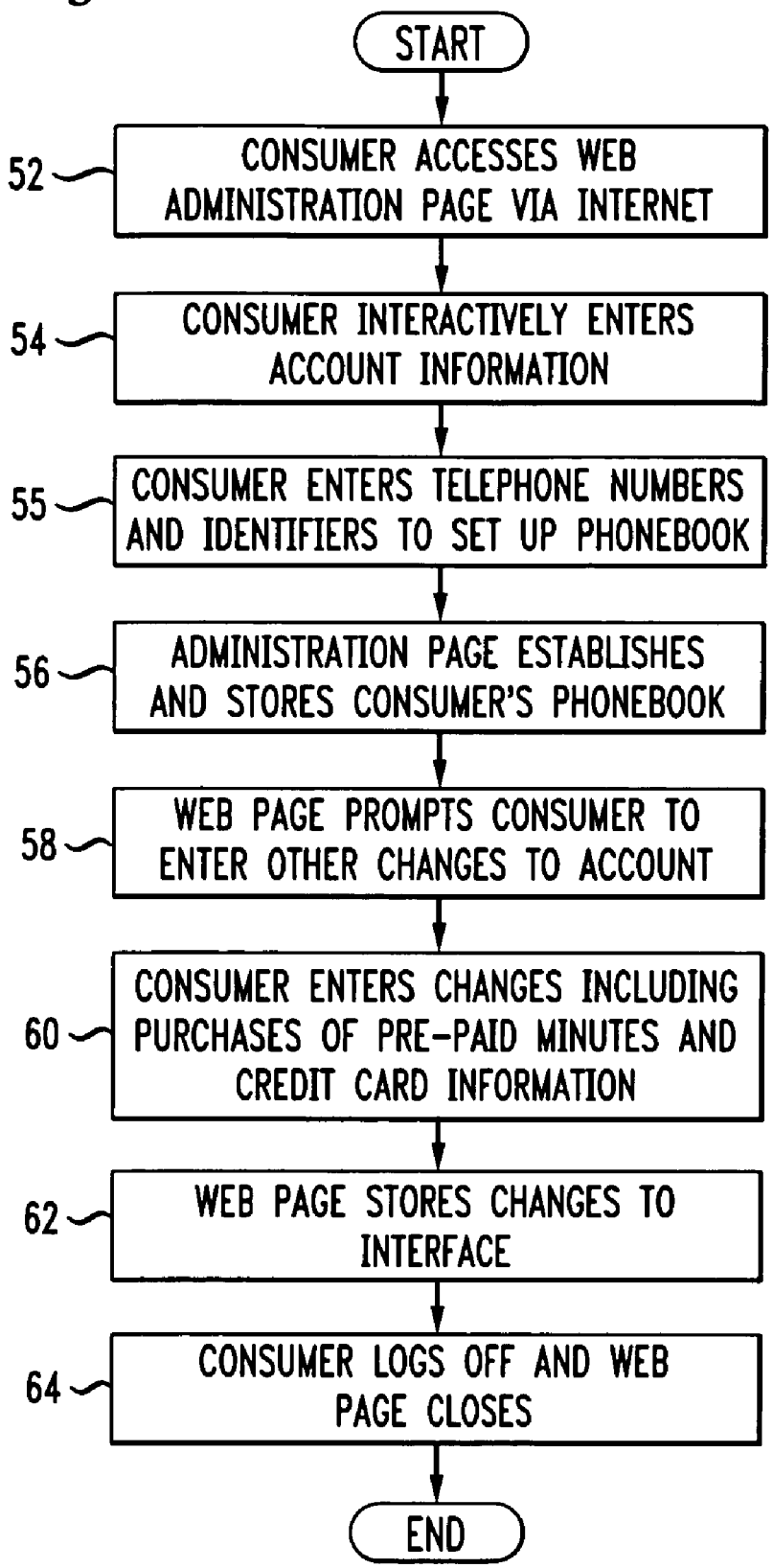

PREPAID PHONE CARD SERVICE USING SPEECH RECOGNITION

FIELD OF THE INVENTION

The present invention relates generally to telecommunication services and, more particularly, to a prepaid phone card system and method using a speech recognition interface for placing a telephone call.

BACKGROUND OF THE INVENTION

Prepaid phone cards offered by telecommunication service providers are widely popular in today's environment. Such cards have a predetermined amount of time in terms of minutes credited thereto and a consumer who purchases the card may apply the credited minutes against the time spent during telephone calls. When the allotted time is spent, the card may be thrown away or, in some cases, may be recharged with additional minutes.

Typically, printed on the prepaid phone card is a telephone number for accessing a phone card service and a personal identification number (PIN) assigned to that particular phone card. Generally, a prepaid phone card user must first dial the access number, then input the PIN number and then input the telephone number of a desired party to place a telephone call to that party. Once the telephone call is connected, the time spent during the call is deducted from the phone card.

One drawback with conventional prepaid phone cards is the large amount of numbers that must be manually input by the caller in order to place a call. For example, the caller must first manually input the access number, which is typically a toll-free "800" type number having a sequence of eleven numbers. The caller then inputs the PIN number, which typically can be another sequence of ten or more numbers, and then the caller dials the number of the desired party, which can be another sequence of eleven numbers. Aside from the time it takes to input all these numbers, if a mistake is made, the caller must start again from the beginning.

Many existing telephony products today offer the ability to enter a short "voice label" code or alias that is translated into a complete destination number when the customer places a call. However, it has been heretofore unknown to provide speech recognition capabilities to phone card users or to provide speech recognition applications with respect to verification of PIN numbers.

Accordingly, it would be desirable to relieve the consumer of one or more of the several layers of dialing to connect to a called party, thereby giving some relief to initiating a prepaid card phone call. It would be further desirable to provide speech recognition along with prepaid phone card telecommunication services to create a faster, more efficient, yet more user-friendly consumer calling experience through voice activated dialing features.

SUMMARY OF THE INVENTION

The present invention is a method for placing a telephone call from a caller using a prepaid phone card. The method generally includes the steps of connecting a caller with a caller interface having a speech recognition application, receiving voice input from the caller in the form of phone card information spoken by the caller, comparing the voice input from the caller with personalized prepaid phone card information previously stored in a database and placing a requested telephone call if the voice input from the caller matches the personalized prepaid phone card information stored in the database.

In a preferred embodiment, the personalized prepaid phone card information stored in the database is a personal identification number (PIN) assigned to the caller's phone card and the voice input from the caller is in the form of a personal identification number (PIN) spoken by the caller. The speech recognition application then compares the spoken personal identification number with the personal identification number (PIN) stored in the database.

The preferred method further includes the step of retrieving a telephone number stored in the database if a voice input from the caller matches a telephone number identifier assigned to the telephone number. Also, the caller preferably initially dials a telephone network access number to connect to the caller interface and the caller interface preferably voice prompts the caller to provide the voice input. In one embodiment, the caller interface identifies the caller based on the origination of the initial telephone call.

In all embodiments, the database is preferably accessible to the caller via the internet for storing and modifying the personalized prepaid phone card information. In particular, the caller may be provided with an option to purchase additional prepaid time for the phone card via the internet and may be provided with an additional option to store a personalized phonebook in the database via the internet, wherein the phonebook contains a plurality of telephone numbers and associated telephone identifiers.

The present invention further involves a telecommunication system for placing telephone calls from callers using a prepaid phone card. The system generally includes a database for storing a caller's personalized prepaid phone card information and a caller interface having a speech recognition application for receiving voice input from the caller and comparing the voice input with the personalized prepaid phone card information stored in the database. The caller interface is further adapted to place a requested telephone call if the voice input from the caller matches the personalized prepaid phone card information stored in the database.

In a preferred embodiment, the database is adapted to store a personal identification number (PIN) assigned to the caller's phone card and the caller interface speech recognition application is adapted to receive voice input from the caller in the form of a personal identification number spoken by the caller. The caller interface speech recognition application is further adapted to compare the spoken personal identification number with the personal identification number (PIN) stored in the database.

The database is also preferably adapted to store at least one telephone number and at least one telephone number identifier assigned to the at least one telephone number. The caller interface speech recognition application is further preferably adapted to receive voice input from the caller in the form of a telephone number identifier spoken by the caller and is adapted to retrieve at least one telephone number if the spoken telephone number identifier matches the telephone number identifier assigned to the at least one telephone number.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 4 is a flow chart showing the steps for accessing a prepaid phone card account, establishing a speech recognition consumer phonebook and making changes to the account.

DETAILED DESCRIPTION OF THE PREFERRED EMBODIMENTS

The present invention is a system and method that allows a consumer to simply dial a toll free access number (as done now both domestically and internationally), state their personal identification, and then, in a preferred embodiment, state either the name, number, or location of the party they want to call. Upon completion of the initial call, the calling party may terminate the session or initiate a new call by pressing pre-established keys. All prepaid minutes used would then be decremented from the card.

Figure 1:
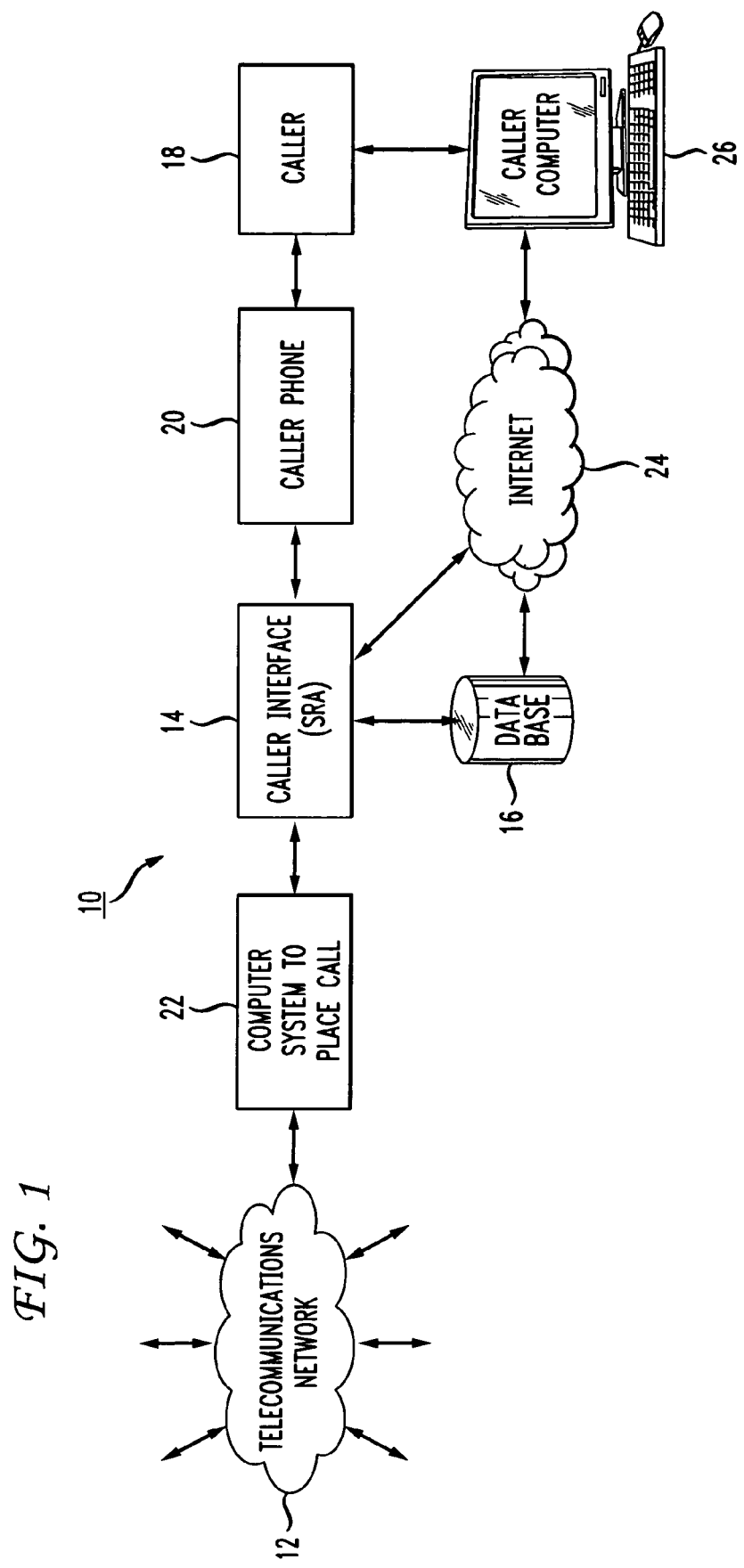
FIG. 1 is a block diagram of a prepaid phone card system using a speech recognition interface for placing a telephone call according to the present invention.

FIG. 1 shows a telecommunication system 10, according to the present invention, for placing telephone calls from callers using a prepaid phone card. The system 10 generally includes a telecommunications network 12 for routing telephone calls to a desired connection, a caller interface 14 connected to the network and having a speech recognition application (SRA) and a database 16 accessible by the caller interface. The speech recognition application generally consists of computer hardware and software which can receive and interpret voice input and can convert the voice input into a computer readable text format.

Figure 2:
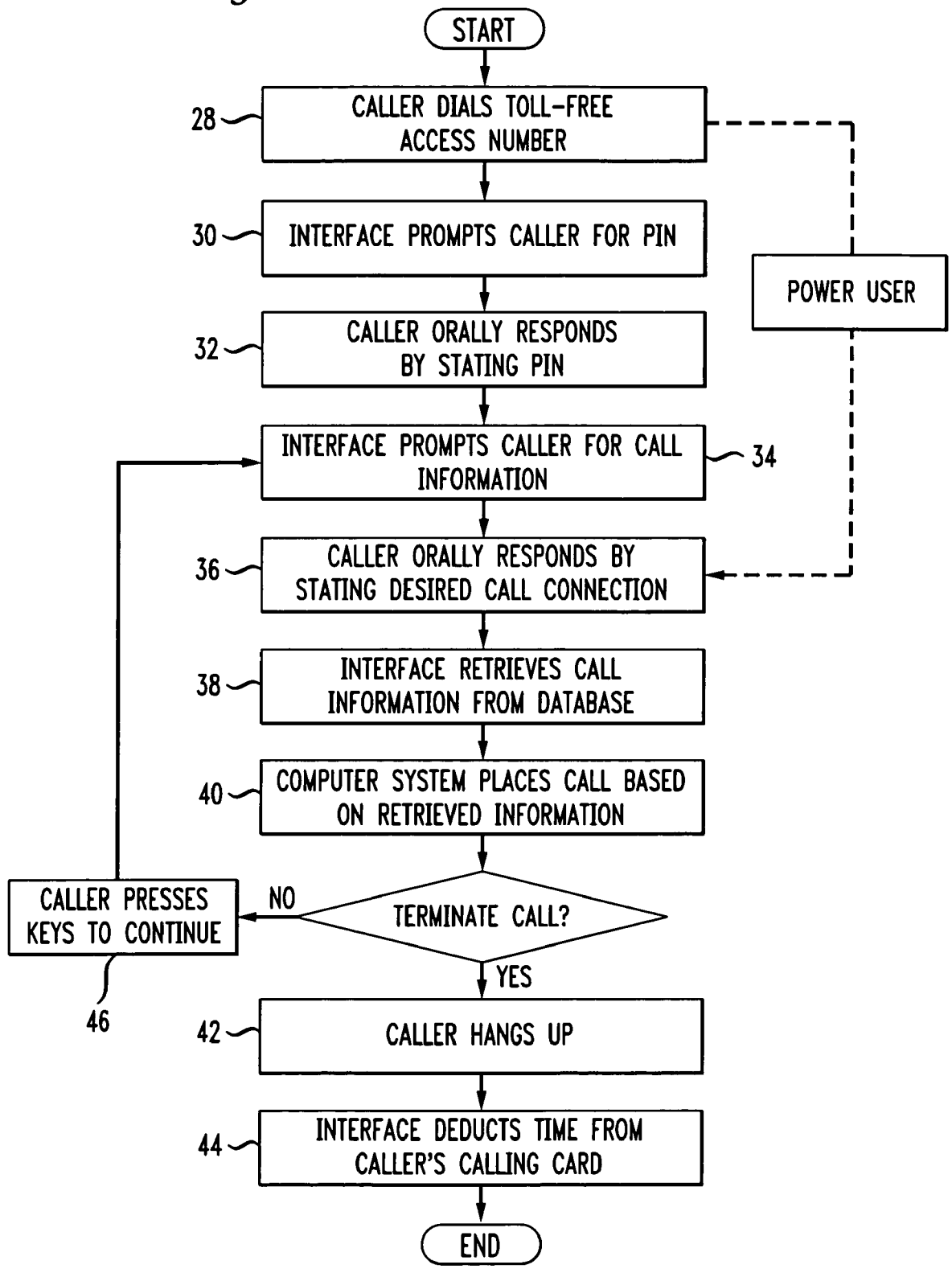
FIG. 2 is a flow chart illustrating a method for placing a telephone call using a prepaid phone card and a speech recognition interface according to the present invention.

Referring additionally to FIG. 2, a caller 18 having a prepaid phone card initiates a telephone call from his telephone 20 by dialing an access number and is then connected with the caller interface 14 in step 28. Once accessed, the speech recognition application of the caller interface 14 preferably voice prompts the caller for information regarding the caller's prepaid phone card in step 30. Generally, this information will be in the form of a personal identification number (PIN) assigned to the prepaid phone card. In step 32, the caller responds by stating the PIN assigned to the phone card the caller wishes to use.

The speech recognition application of the caller interface 14 receives the voice input from the caller regarding the PIN and converts this voice input to computer readable text. The speech recognition application then compares the converted text PIN to personalized prepaid phone card information stored in the database 16. If a PIN match is found, the caller interface 14 can then verify if the phone card matching the PIN has any prepaid minutes remaining and, if so, the caller may continue to place a desired telephone call by dialing a telephone number in the conventional manner. Thus, the step of manually pressing the caller's PIN sequence into the keypad of the telephone is eliminated by the present invention.

The speech recognition application can be programmed to be speaker dependent for additional security, wherein an individual's "voice print" as well as the PIN must match before a call can be made. However, it is anticipated that the service of the present invention will likely be tailored for family use wherein the voice label recognition application would be speaker independent and anyone speaking the same words will be able to use a defined voice label.

In a preferred embodiment, the speech recognition application of the caller interface 14 further voice prompts the caller for information regarding the telephone call the caller wishes to make in step 34 and, again, the caller orally responds in step 36. In this case, the caller states a telephone number identifier and the speech recognition application of the caller interface 14 converts the voice input from the caller into a usable form and, in step 38, the caller interface retrieves the telephone number associated with the telephone number identifier from a personalized phone book stored in the database 16. The telecommunications system 10 according to the present invention further preferably includes a computer system 22 to place a telephone call based on the retrieved telephone number in step 40.

Upon completing the telephone call, the caller may then terminate the connection to the caller interface 14 by hanging up in step 42, at which time the caller interface deducts the amount of minutes used from the caller's prepaid phone card account in step 44, or the caller may initiate another telephone call by pressing a defined keypad key or keys in step 46.

Figure 3:
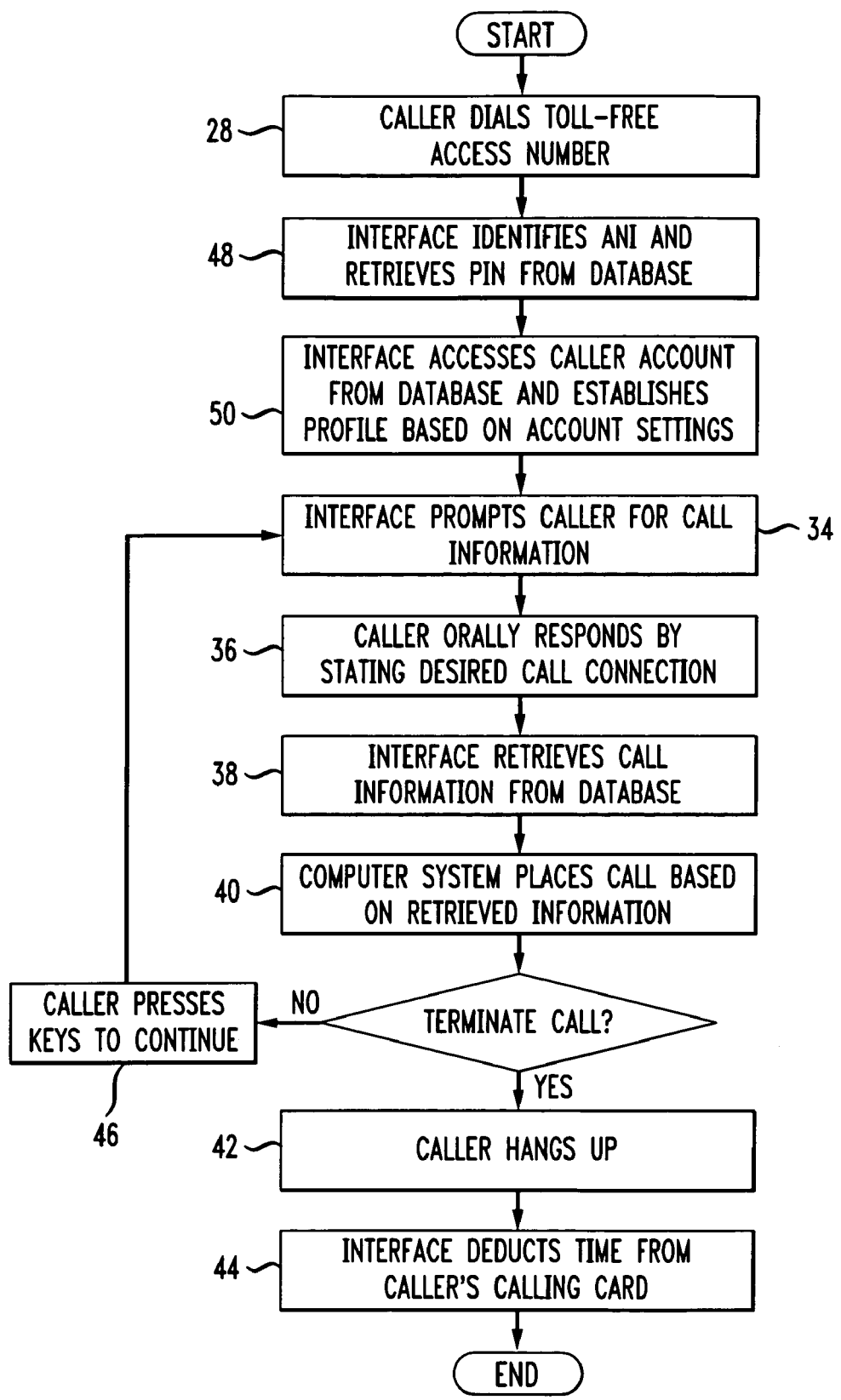
FIG. 3 is a flow chart illustrating an alternative method for placing a telephone call using a prepaid phone card and a speech recognition interface according to the present invention.

In an alternative embodiment, as shown in FIG. 3, a consumer may have the ability via the web to associate either their home phone number or their wireless number with their PIN number, so that when placing a call, the caller interface platform 14 would identify their PIN information based on the chosen originating telephone (ANI). Thus, the caller first dials the toll free access number in step 28 to connect to the caller interface, as described above. However, in this embodiment, the caller interface 14 identifies the caller based on the origination of the initial telephone call in step 48. Once the caller has been identified, the caller interface can then access the caller's account from the database 16 and establish the caller's profile based on the account settings in step 50. The call then progresses in step 34, as described above, with the caller interface prompting the user to provide voice input with respect to the telephone call the caller wishes to make.

As mentioned above, a caller 18 may establish and store in the database 16 a personalized phone book containing a plurality of frequently used telephone numbers and easily remembered telephone identifiers. To enable this feature, the database 16 is preferably accessible via the internet 24. Thus, a prepaid phone card service provider may offer an internet administration webpage interface that is accessible by the caller 18 using a computer 26. The internet administration webpage provides a convenient and simple way for the consumer to activate and maintain a variety of voice dialing features on their prepaid cards. For example, via the webpage, customers would be able to create and modify their personal phonebooks, activate ANI association, retrieve e-mail or PIN information, or view detailed help pages. The webpage may also provide a more experienced consumer (a "power user") the option to eliminate some of the voice prompts they receive when using the voice activated dialing system, providing faster, more efficient service. For security concerns, access to the webpage can be made password controlled.

Referring now to FIG. 4, the caller first accesses the prepaid phone card service provider's web administration page via the internet in step 52. In step 54, the caller interactively enters information related to the prepaid phone card, including account information and PIN. Once the account is activated, the consumer may begin to set up a personal phone book in step 55 by entering frequently used telephone numbers and associated telephone number identifiers, such as names or locations. In step 56, the administration page then assigns voice labels corresponding to the associated telephone number identifiers and stores the personal phonebook in the database 16. The voice labels can be stored as text strings for ease of manipulation and converted to speech by conventional text-to-speech technology. Once names and numbers have been entered via the Internet, callers can then place a call to an individual/location in the phonebook simply by speaking a telephone number identifier, such as a name or location (e.g., "call home," "call office," "Tom Smith," etc.) without physically having to say the full terminating number. Using speech-to-text technology, the speech recognition application of the caller interface then converts the spoken telephone number identifier to text and searches for the voice label matching the telephone number identifier and retrieves the associated telephone number.

The administration webpage may provide the consumer with additional options as well. The consumer may be given the option to change account information in step 58, wherein, for example, the consumer may recharge a phone card by purchasing additional minutes. Thus, the consumer may input credit card information and select the desired amount of minutes to purchase in step 60. Access to the phone card caller's call detail records (CDRs) can also be made available via the internet 24 on a real-time basis. Especially beneficial for the traveling consumer, another feature on the webpage could assist consumers if they forgot their PIN numbers and do not have the prepaid phone cards with them. Via the web site, a consumer could obtain their PIN by entering an e-mail address, or other key word, listed on their account. The PIN number could then be mailed to that e-mail address and not given outright. Any changes made by the consumer are stored in the database in step 62 when the consumer logs off the webpage in step 64.

As a result of the present invention, a prepaid phone card telecommunication service is provided having a speech recognition application to create a faster, more efficient, yet more user-friendly consumer calling experience through voice activated dialing features. In particular, the present invention relieves the consumer of one or more of the several layers of dialing to connect to a called party, thereby giving some relief to initiating a prepaid card phone call.

While there has been described what is presently believed to be the preferred embodiments of the invention, those skilled in the art will realize that various changes and modifications may be made to the invention without departing from the spirit of the invention, and it is intended to claim all such changes and modifications as fall within the scope of the invention.

What is claimed is:

1. A method for placing a telephone call from a caller using a prepaid phone card, the method comprising the steps of:

connecting a caller with a caller interface having a speech recognition application, wherein said caller initially dials a telephone network access number to connect to said caller interface;

identifying said caller based on the origination of said initial telephone call by comparing the origination of said initial telephone call with a telephone number associated with said prepaid phone card previously stored in a database;

prompting said caller to vocally input a personal identification number (PIN) associated with said prepaid phone card if the origination of said initial telephone call matches said telephone number previously stored in said database;

receiving voice input from said caller in the form of said PIN spoken by said caller;

comparing said PIN spoken by said caller with a PIN associated with said prepaid phone card previously stored in said database;

prompting said caller to vocally input a desired call connection if said spoken PIN matches said PIN previously stored in said database;

receiving voice input from said caller in the form of a desired call connection spoken by said caller;

comparing said voice input spoken by said caller with a personal voice print associated with said call connection and assigned to said caller's phone card and previously stored in a database; and placing said desired call connection if said voice input spoken by said caller matches said personal voice print assigned to said caller's phone card stored in said database with respect to said call connection, wherein said database is accessible by said caller via the internet for enabling said caller origination identification step and for storing and modifying said caller origination telephone number, said PIN and said personalized voice print with respect to said call connection associated with said prepaid phone card.

2. A method for placing a telephone call as defined in claim 1, wherein said voice print comprises a verbal telephone number identifier previously stored in said database by said caller with respect to said call connection and said step of placing said desired call connection comprises the step of retrieving a telephone number stored in said database if said voice input from said caller matches said telephone number identifier assigned to said telephone number.

3. A method for placing a telephone call as defined in claim 1, further comprising the step of voice prompting said caller to verbally provide said desired call connection.

4. A method for placing a telephone call as defined in claim 1, further comprising the step of providing said caller with an option to purchase additional prepaid time for said phone card via the internet.

5. A method for placing a telephone call as defined in claim 1, further comprising the step of providing said caller with an option to store a personalized phonebook in said database via the internet, said phonebook containing a plurality of telephone numbers and associated telephone identifiers.

* * * * *